(12) United States Patent
Vykunta

(10) Patent No.: US 8,185,951 B2
(45) Date of Patent: May 22, 2012

(54) METHOD OF HANDLING USER GROUPS IN DESKTOP AND WEB BASED APPLICATIONS IN A HETEROGENEOUS AUTHENTICATION ENVIRONMENT

(75) Inventor: Venkateswara R. Vykunta, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1141 days.

(21) Appl. No.: 11/613,792

(22) Filed: Dec. 20, 2006

(65) Prior Publication Data

US 2008/0155682 A1    Jun. 26, 2008

(51) Int. Cl.
*H04L 29/06* (2006.01)
(52) U.S. Cl. ......................................................... 726/21
(58) Field of Classification Search ....................... 726/21
See application file for complete search history.

(56) References Cited

U.S. PATENT DOCUMENTS

| | | | | |
|---|---|---|---|---|
| 6,581,054 B1 * | 6/2003 | Bogrett | ............................. | 707/4 |
| 6,728,884 B1 * | 4/2004 | Lim | ................................ | 726/12 |
| 2003/0005297 A1 * | 1/2003 | Fichtner et al. | ................ | 713/168 |
| 2003/0033535 A1 * | 2/2003 | Fisher et al. | ................... | 713/185 |
| 2005/0071667 A1 * | 3/2005 | Dankovich et al. | ............ | 713/200 |
| 2005/0097166 A1 * | 5/2005 | Patrick et al. | .................. | 709/203 |
| 2005/0108575 A1 * | 5/2005 | Yung | ............................. | 713/201 |
| 2006/0005036 A1 * | 1/2006 | Hu et al. | ........................ | 713/182 |
| 2007/0189288 A1 * | 8/2007 | Andrews et al. | .............. | 370/390 |

* cited by examiner

*Primary Examiner* — Michael S McNally
(74) *Attorney, Agent, or Firm* — Cantor Colburn LLP; Feb Cabrasawan

(57) ABSTRACT

An embodiment of the present invention is a method that effectuates the handling of user group membership information in a heterogeneous information technology environment having multiple authentication sources. The method including creating a plurality of first user groups in a security model used by an application, adding an attribute to each of said plurality of first user groups and setting the value of each of the attributes to a name corresponding to each of a plurality of second user groups in a plurality of heterogeneous authentication sources, granting a plurality of privileges to said plurality of first user groups as required by said application, causing said user to inherit a plurality of privileges for each of said plurality of second user groups identified in a plurality of user group names list based on said security module authentication and allowing a user to log into said application using said security module.

15 Claims, 2 Drawing Sheets

1000

1000

METHOD OF HANDLING USER GROUPS IN DESKTOP AND WEB BASED APPLICATIONS IN A HETEROGENEOUS AUTHENTICATION ENVIRONMENT

CROSS-REFERENCE TO RELATED APPLICATIONS

This application contains subject matter, which is related to the subject matter of the following co-pending applications, each of which is assigned to the same assignee as this application, International Business Machines Corporation of Armonk, N.Y. Each of the below listed applications is hereby incorporated herein by reference in its entirety:

Ser. No. 11/613,802 entitled "METHOD OF HANDLING USER AUTHENTICATION IN A HETEROGENEOUS AUTHENTICATION ENVIRONMENT".

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a method that effectuates the handling of user group membership information in a heterogeneous information technology (IT) environment having multiple authentication sources.

2. Description of Background

A heterogeneous authentication environment in an information technology (IT) organization is supported by multiple authentication sources like Lightweight Directory Access Protocol (LDAP) servers, NIS and many custom application authentication sources. Users of desktop and web based applications in such an environment are located in one or many of these authentication sources. Many of these authentication sources support the notion of user groups to logically group the users based on certain attributes of the users (ex: Marketing department users, MIS users, System Administrator users etc). The user groups of the users of desktop and web based applications are also defined in one or many of the authentication sources in the IT organization. Managing the privileges of users who are members of these user groups can be difficult for the security developers of desktop and web based applications especially when user group memberships change dynamically due to changes in roles or responsibilities of users in the IT organization.

Many desktop and web based applications get around this problem by periodically importing their user group membership information from the authentication sources of the IT organization. They use tools like scripts, and background processes to accomplish this task. There are many problems with this approach. One such problem can be that the user group membership information accessed by the applications is outdated and or incorrect, if the System Administrator modified information immediately after the import of the user group data is performed by the application.

Another such problem can be that the user group membership information is duplicated in the applications and in the authentication sources, which sometimes result in incorrect resolution of privileges, inherited through the user groups.

As such, the aforementioned problems and long felt need for a better method of handling user group membership information in a heterogeneous IT environment in part gives rise to the present invention.

SUMMARY OF THE INVENTION

The shortcomings of the prior art are overcome and additional advantages are provided through the provision of a method of handling user groups in desktop and web based applications in heterogeneous authentication environments, the method comprising: creating a plurality of user groups in a security model used by a plurality of applications; adding a plurality of attributes to the plurality of user groups, the plurality of attributes are EXTERNAL GROUP NAME to the plurality of user groups; setting the value of each of the plurality of attributes to the name corresponding to specific the plurality of user groups in an authentication source in which the plurality of user groups is mapped; granting a plurality of privileges to the plurality of user groups as required by each of the plurality of applications; using the authentication module to authenticate a user; identifying, with the authentication module, by reading from the authentication source a plurality of user group names list, wherein the plurality of user group names list is a list of the plurality of user groups from which the user received successful authentication; and causing the user to inherit the plurality of privileges for each of the plurality of user groups identified in the plurality of user group names list.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which is a method that effectuates the handling of user group membership information in a heterogeneous information technology (IT) environment having multiple authentication sources.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
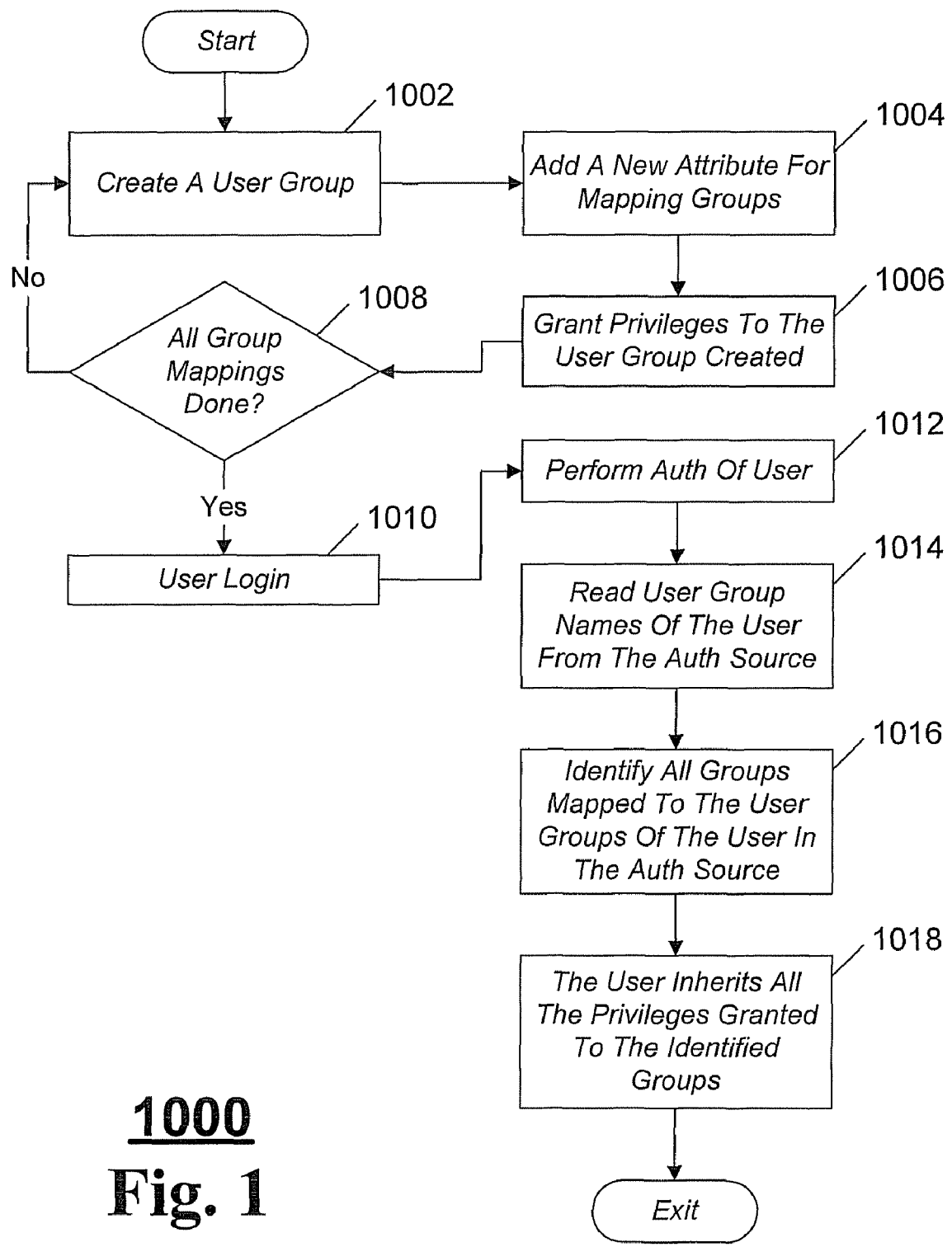
FIG. 1 illustrates one example of a method that effectuates the handling of user group membership information in a heterogeneous information technology (IT) environment having multiple authentication sources.

Turning now to the drawings in greater detail, it will be seen that in FIG. 1 there is one example of a method that effectuates the handling of user group membership information in a heterogeneous information technology (IT) environment having multiple authentication sources. In an exemplary embodiment, to ease the difficulties in handling user group membership information in a heterogeneous IT environment with multiple authentication sources routine 1000 a method of handling the group membership information can be effectuated.

In this regard, user groups can be created in the security model used by the application. New EXTERNAL GROUP NAME attributes can be added to the created user groups; values of the EXTERNAL GROUP NAME attributes can be set to the name of the corresponding user group in the authentication source to which the group is mapped; and privileges can then be granted to the newly created user group as required by the applications.

Once all the relevant external user groups are mapped users can then attempt to log into the applications. When a user tries to log into the applications the authentication module performs user authentication as defined by the applications; the authorization module then identifies by reading a list of user group names from the authorization source which the user received successful authentication; the method then causes the user to inherit privileges for each of the groups identified in the list of user group names; the user can then utilize the applications in a manner consistent with the privileges that have been inherited by the user. The method begins in block 1002.

In block 1002 user groups are created in the security model used by the applications. Processing then moves to block 1004.

In block 1004 new EXTERNAL GROUP NAME attributes are added to the newly created user groups. In addition, values of the EXTERNAL GROUP NAME attributes are set to the name corresponding to the specific user group in the authentication source to which the group is mapped. Processing then moves to block 1006.

In block 1006 privileges to the newly created groups are granted as required by the applications. Processing then moves to decision block 1008.

In decision block 1008 a determination is made as to whether or not all the user group mappings are done. If the resultant is in the affirmative that is all the user group mappings are done then processing moves to block 1010. If the resultant is in the negative that is all the user group mappings are not done than processing returns to block 1002.

In block 1010 users are allowed to attempt to login into the applications. Processing then moves to block 1012.

In block 1012 when the user logs into an application, the authentication and authorization modules of the application perform user authentication as defined by the application. Processing then moves to block 1014.

In block 1014 the authorization module reads the names of the user groups of the user from the authorization source that successfully authenticated the user. Processing then moves to block 1016.

In block 1016 the authorization module identifies all user groups that have been created and have their EXTERNAL GROUP NAME attribute set to one of the group name that was read by the authorization module. In this regard, block 1014 and 1016 operate to produce a group names list. The group names list is a list of the user groups which the user received successful authentication. Processing then moves to block 1018.

In block 1018 the user inherits all the privileges granted to the identified user groups. In this regard, the user can now use certain of the applications based on and in a manner consistent with the privileges inherited by the user. The routine is then exited.

Figure 2:
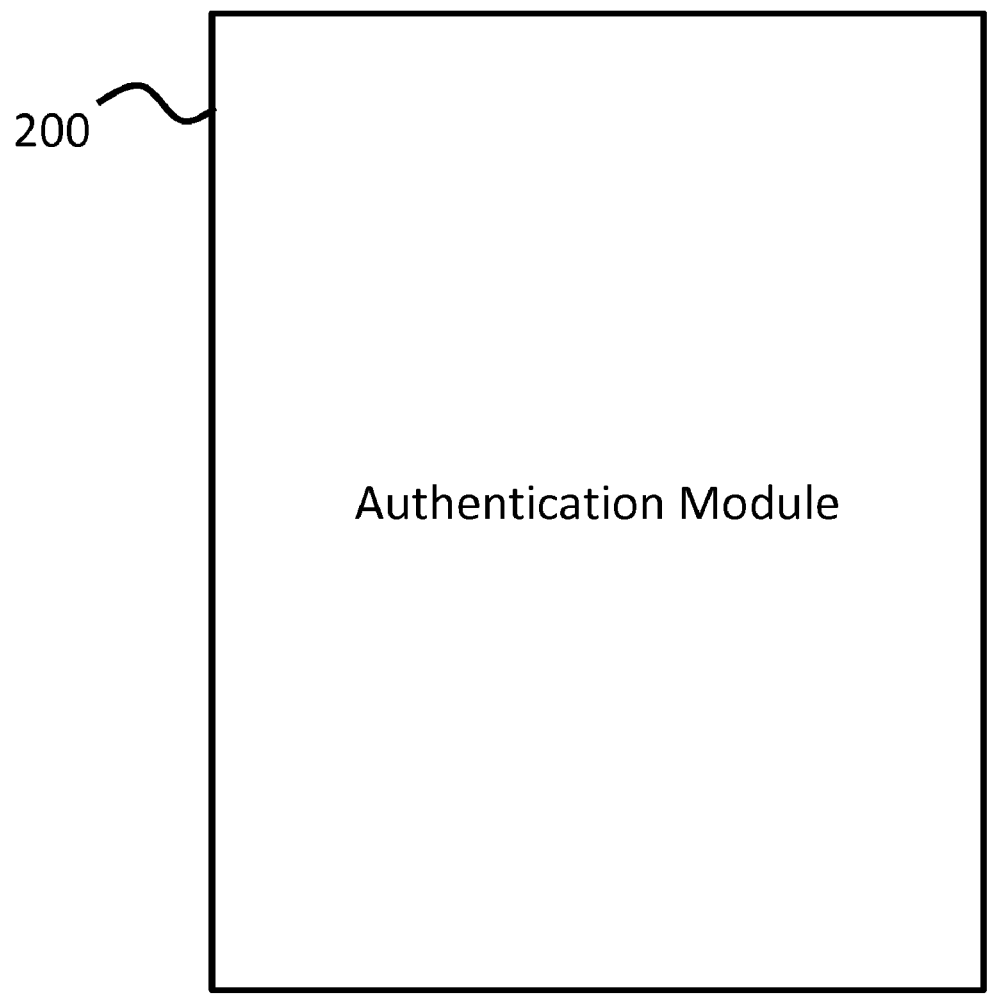
FIG. 2 illustrates a hardware authentication module in an embodiment.

The capabilities of the present invention can be implemented in software, firmware, hardware or some combination thereof. In an embodiment, the authentication module described with regard to the process flow of FIG. 1 is executed in a hardware authentication module 200 of FIG. 2.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for handling user groups in desktop and web based applications in heterogeneous authentication environments, said method comprising:

creating a plurality of first user groups in a security model used by an application;

adding an external group name attribute to each of said plurality of first user groups, the external group name attribute mapping each of the plurality of first user groups and one or more of a plurality of second user groups;

setting the value of each of the external group name attributes to a name corresponding to each of a plurality of second user groups, said each of the plurality of second user groups mapped to one or more other authentication sources;

granting a plurality of privileges to said plurality of first user groups as required by said application;

using said security model to authenticate a user, the user assigned to at least one of the plurality of first user groups;

identifying, via a computer, a list of groups associated to the user, via said security model, by reading from said external group name attribute a plurality of user group names associated to said user, wherein said plurality of user group names is a list of said plurality of second user groups;

causing said user to inherit a plurality of privileges for each of said plurality of second user groups identified in said plurality of user group names list based on said security model authentication;

allowing the user to log into said application by way of said security model; and wherein the creating, adding, setting, and granting are repeated for a plurality of applications, each of the plurality of applications comprising a security model, and authenticating to at least one of said one or more other authentication sources.

2. The method in accordance with claim 1, wherein creating, adding, setting, and granting are repeated until all relevant external said plurality of second user groups are mapped.

3. The method in accordance with claim 1, wherein said security model is used in a manner predefined by each of said plurality of applications.

4. The method in accordance with claim 3, further comprising:
allowing said user to use certain of said plurality of applications based on and in a manner consistent with said plurality of privileges inherited by said user.

5. The method in accordance with claim 4, wherein said one or more other authentication sources exist in a heterogeneous information technology environment.

6. A system for handling user groups in desktop and web based applications in heterogeneous authentication environments, said system comprising:
a hardware authentication module, the authentication module performing a method comprising:
creating a plurality of first user groups in a security model used by an application;
adding an external group name attribute to each of said plurality of first user groups, the external group name attribute mapping each of the plurality of first user groups and one or more of a plurality of second user groups;
setting the value of each of the external group name attributes to a name corresponding to each of a plurality of second user groups, said each of the plurality of second user groups mapped to one or more other authentication sources;
granting a plurality of privileges to said plurality of first user groups as required by said application;
using said security model to authenticate a user, the user assigned to at least one of the plurality of first user groups;
identifying, a list of groups associated to the user, via said security model, by reading from said external group name attribute a plurality of user group names associated to said user, wherein said plurality of user group names is a list of said plurality of second user groups;
causing said user to inherit a plurality of privileges for each of said plurality of second user groups identified in said plurality of user group names list based on said security model authentication;
allowing the user to log into said application by way of said security model; and
wherein the creating, adding, setting, and granting are repeated for a plurality of applications, each of the plurality of applications comprising a security model, and authenticating to at least one of said one or more other authentication sources.

7. The system in accordance with claim 6, wherein creating, adding, setting, and granting are repeated until all relevant external said plurality of second user groups are mapped.

8. The system in accordance with claim 6, wherein said security model is used in a manner predefined by each of said plurality of applications.

9. The system in accordance with claim 8, further comprising:
allowing said user to use certain of said plurality of applications based on and in a manner consistent with said plurality of privileges inherited by said user.

10. The system in accordance with claim 9, wherein said one or more other authentication sources exist in a heterogeneous information technology environment.

11. A computer program product for handling user groups in desktop and web based applications in heterogeneous authentication environments, said computer program product comprising:
a non-transitory computer readable media readable by a computer and storing instructions for performing a method comprising:
an authentication module, the authentication module performing a method comprising:
creating a plurality of first user groups in a security model used by an application;
adding an external group name attribute to each of said plurality of first user groups, the external group name attribute mapping each of the plurality of first user groups and one or more of a plurality of second user groups;
setting the value of each of the external group name attributes to a name corresponding to each of a plurality of second user groups, said each of the plurality of second user groups mapped to one or more other authentication sources;
granting a plurality of privileges to said plurality of first user groups as required by said application;
using said security model to authenticate a user, the user assigned to at least one of the plurality of first user groups;
identifying a list of groups associated to the user, via said security model, by reading from said external group name a plurality of user group names associated to said user, wherein said plurality of user group names is a list of said plurality of second user groups;
causing said user to inherit a plurality of privileges for each of said plurality of second user groups identified in said plurality of user group names list based on said security model authentication;
allowing the user to log into said application by way of said security model; and
wherein the creating, adding, setting, and granting are repeated for a plurality of applications, each of the plurality of applications comprising a security model, and authenticating to at least one of said one or more other authentication sources.

12. The computer program product in accordance with claim 11, wherein creating, adding, setting, and granting are repeated until all relevant external said plurality of second user groups are mapped.

13. The computer program product in accordance with claim 11,
wherein said security model is used in a manner predefined by each of said plurality of applications.

14. The computer program product in accordance with claim 13, further comprising:
allowing said user to use certain of said plurality of applications based on and in a manner consistent with said plurality of privileges inherited by said user.

15. The computer program product in accordance with claim 14, wherein said one or more other authentication sources exist in a heterogeneous information technology environment.

* * * * *